United States Patent [19]

Eve et al.

[11] 4,430,572
[45] Feb. 7, 1984

[54] DEVICE FOR SEPARATING TWO LIGHT SIGNALS EMITTED BY SOURCES HAVING DIFFERENT WAVELENGTHS AND TRANSMITTED IN A SINGLE OPTICAL FIBER

[75] Inventors: Michel Eve; Bernard Floch, both of Conflans Ste. Honorine, France

[73] Assignee: Lignes Telegraphiques Et Telephoniques, Conflans Ste. Honorine, France

[21] Appl. No.: 302,031

[22] Filed: Sep. 14, 1981

[30] Foreign Application Priority Data

Sep. 12, 1980 [FR] France .................................. 8019743

[51] Int. Cl.³ .............................................. G02B 27/00
[52] U.S. Cl. ..................... 250/551; 455/602; 455/610
[58] Field of Search ................ 250/227, 551; 455/602, 455/608-613

[56] References Cited

FOREIGN PATENT DOCUMENTS 9534 4/1980 European Pat. Off. .

OTHER PUBLICATIONS

*Journal of Applied Physics,* vol. 51, No. 1, Aug. 8, 1980, (New York) Sheem et al.: "Single-Mode Fiber Wavelength Multiplexer", pp. 4050-5052.
*IEEE Transactions on Communications,* vol. COM-26, No. 7, Jul. 1978, New York, Miki et al.: "Viabilities of the Wavelength-Division-Multiplexing Transmission System Over an Optical Fiber Cable, ", pp. 1082-1087.

*Primary Examiner*—F. L. Evans
*Attorney, Agent, or Firm*—Roland Plottel

[57] ABSTRACT

A device for separating two light signals having different wavelengths transmitted in one and the same optical fiber, comprising an optical fiber terminating in two branched-off portions of fiber having in one case an extension of predetermined length, two photodetectors placed respectively at the output of said extension and of the other branched-off portion of fiber, delay means connected to the output of one of the photodetectors, differentiating means for receiving the signals generated by the delay means and the signals detected by the other photodetector, and an electronic processing circuit connected to the output of the differentiator.

8 Claims, 1 Drawing Figure

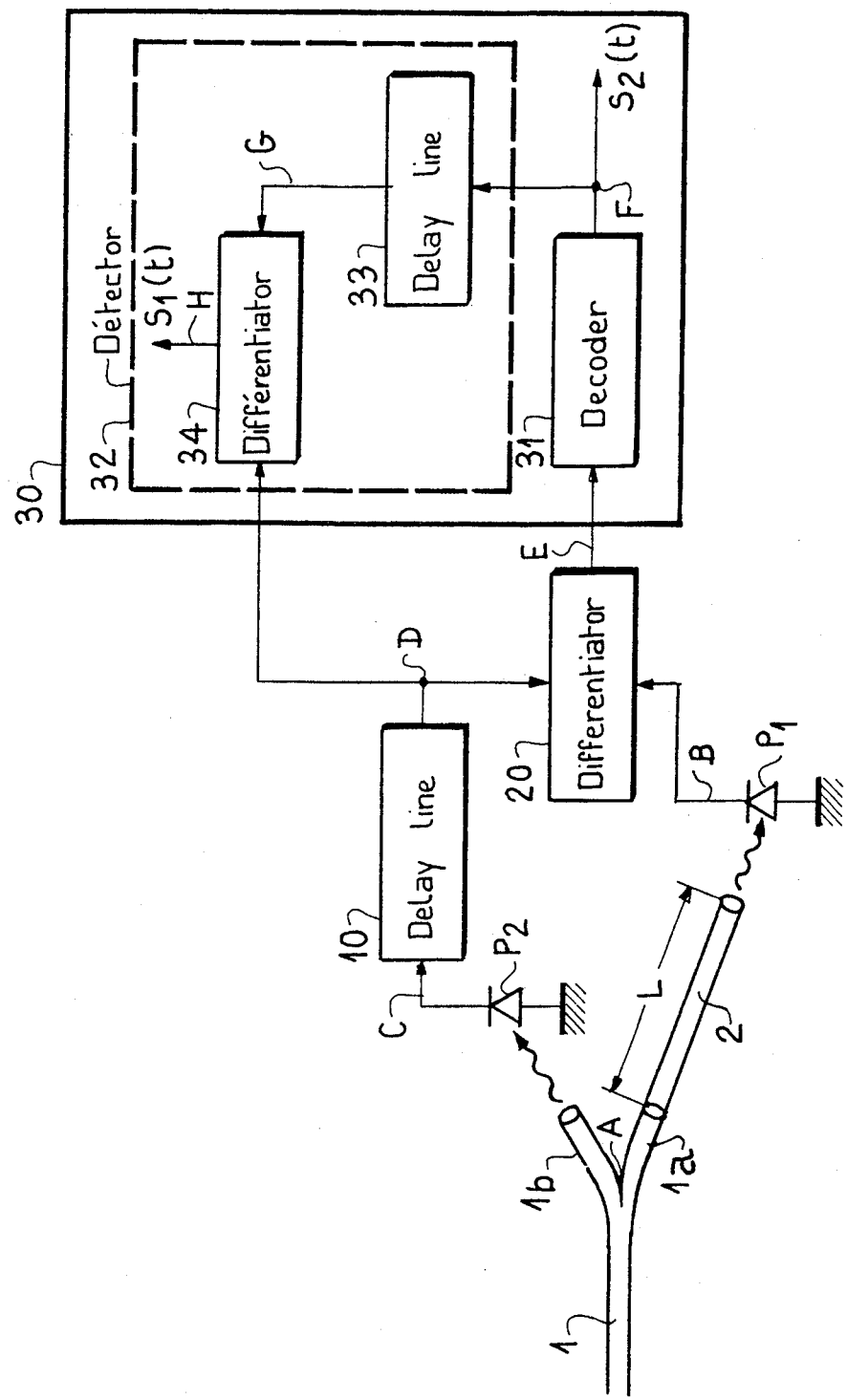

DEVICE FOR SEPARATING TWO LIGHT SIGNALS EMITTED BY SOURCES HAVING DIFFERENT WAVELENGTHS AND TRANSMITTED IN A SINGLE OPTICAL FIBER

This invention generally relates to optical fiber transmission systems and more particularly to a device for separating two light signals having different wavelengths and transmitted over one and the same optical fiber.

In order to demultiplex two different wavelengths simultaneously in an optical fiber transmission system, a known practice consists in carrying out spatial separation of said wavelengths by making use of complex optical devices such as dielectric thin film filters, diffraction gratings or dispersion prisms. These devices, however, are both bulky and delicate.

Instead of optical devices of this type, it is also known to employ a photodiode having a structure which makes it possible at the same time both to detect and to demultiplex two wavelengths as described in the article entitled "Dual-wavelength demultiplexing InGaAsP photodiode" and published in "Applied Physics Letters", volume 34, No. 6, March 15th 1979, page 401. In this article, the photodiode is constituted by a substrate on which a succession of layers are formed by epitaxial growth. Two of these layers are doped so as to form two photodiodes. From the technological standpoint, however, it proves very difficult to achieve perfectly homogeneous crystal growth of the different layers; furthermore, a perfect separation of the spectral responses of the two layers forming photodiodes is difficult to obtain.

The aim of the present invention is to overcome these disadvantages by proposing a device for separating or demultiplexing two light signals emitted simultaneously by two sources having different wavelengths and transmitted in one and the same optical fiber, which is wholly satisfactory, has a simple structure based on conventional electronic equipment and is inexpensive to produce. This device is so designed as to carry out time separation of the two wavelengths. The principle of time separation is based on a known property which is inherent in optical fibers, namely the fact that an optical fiber does not have the same characteristics of transmission at two different wavelengths. In particular, the times of propagation within the fiber of light signals emitted simultaneously by a plurality of sources may vary considerably from one wavelength to another.

To this end, the invention is directed to a device for separating two light signals emitted by two sources having different wavelengths, each light source being modulated by a periodic signal, said light signals having different wavelengths being transmitted in one and the same optical fiber with first propagation times of different value. The optical fiber terminates in a first branched-off portion of fiber and in a second branched-off portion of fiber, a part of the light signals transmitted being shunted to each portion. The first branched-off portion of fiber is provided with a predetermined extension in which the shunted light signals (branch signals) are transmitted with different second propagation times.

The separating device according to the invention comprises:

a first photodetector and a second photodetector which are placed respectively opposite to the extension of the first branched-off portion of fiber and opposite to the second branched-off portion of fiber, the first photodetector being intended to detect part of the periodic modulation signals having respective time delays corresponding to the sum of the first and second propagation times and the second photodetector being intended to detect the other part of the periodic modulation signals having respective time delays corresponding to the first propagation times;

first delay means connected to the second photodetector and adapted to introduce a time delay equal to one of the second propagation times;

first means for differentiation between the delayed periodic signals generated by the first delay means and the delayed periodic signals detected by the first photodetector, said differentiating means being intended to deliver a delayed periodic signal corresponding to a coding of one of the periodic signals which modulates one of the two light sources having different wavelengths;

an electronic circuit for processing the delayed periodic signals and comprising means for detecting the other periodic signal which modulates the other light source, said means being connected between the output and one of the inputs of the first differentiating means.

As will be understood, the predetermined extension of one of the branched-off portions of fiber will thus introduce different propagation times in respect of the shunted light signals. By modifying the value of the time delay introduced by the delay means, this will make it possible to carry out time separation of the two light signals having different wavelengths.

Other features and advantages of the invention will become more readily apparent upon consideration of the following description, reference being made to the single accompanying FIGURE in which the separating device according to the invention is illustrated schematically and partly in the form of blocks.

In one example of construction, the accompanying diagram shows at 1 the core of a monomode or multimode optical fiber.

In order to increase the optical fiber transmission capacity, it is customary practice to employ a number of sources such as, for example, laser diodes which emit simultaneously light signals having different wavelengths or in other words colors. The two wavelengths usually adopted in optical fiber transmission are equal to 0.85 $\mu$m and 1.3 $\mu$m.

In addition, each laser diode is modulated by a periodic signal such as, for example, a digital signal representing the information to be transmitted in the optical fiber 1.

It will be postulated by way of example that a first laser diode having a wavelength $\lambda_1$ (0.85 $\mu$m) is modulated by a first digital signal $S_1(t)$ of the form:

$$S_1(t) = \sum_{-\infty}^{+\infty} a_n(t - nT)$$

where $a_n = 0$ or 1, and where T is the period of said signal; and that a second laser diode having a wavelength $\lambda_2$ (1.3 $\mu$m) is modulated by a second digital signal $S_2(t)$ having the same period T, of the form:

$$S_2(t) = \sum_{-\infty}^{+\infty} b_n(t - nT)$$

where $b_n = 0$ or 1.

It will be noted that the period of the signal $S_2(t)$ can also be a multiple of the period T of the signal $S_1(t)$ without thereby departing from the scope of the invention.

In accordance with the known property of optical fibers mentioned earlier, the two light signals emitted simultaneously by the two laser diodes having wavelengths $\lambda_1$ and $\lambda_2$ and modulated by the two digital signals $S_1(t)$ and $S_2(t)$ propagate within the optical fiber 1 with different propagation or transmit times; thus the light signal of wavelength $\lambda_1$ propagates within the fiber during a time interval $T_1$ whilst the light signal of wavelength $\lambda_2$ propagates during a times interval $T_2$ which is different from $T_1$. By way of illustration, in the case of the two wavelengths equal to 0.85 μm and 1.3 μm, the difference in propagation times $(T_1-T_2)$ is of the order of 50 ns per kilometer.

Under these conditions, and reverting to the example given in the foregoing, there would be detected at the end A of the fiber 1 a digital signal $S_A(t)$ of the form:

$$S_A(t) = S_1(t-T_1) + S_2(t-T_2)$$

whence $$S_A(t) = \sum_{-\infty}^{+\infty} a_n(t - nT - T_1) + \sum_{-\infty}^{+\infty} b_n(t - nT - T_2)$$

As shown in the FIGURE, the end A of the fiber 1 terminates in two branched-off portions of fiber (1a, 1b), the optical power transmitted in the fiber 1 being shunted or diverted into each branched-off portion. The construction of the two branches 1a and 1b may be carried out by any method known to those versed in the art.

A secondary optical fiber 2 having a predetermined length L is added or in other words connected (by splicing, for example) to the end of the fiber branch 1a. Said secondary fiber 2 can also form an integral part of the main fiber 1, thus constituting an extension of the fiber branch 1a. Under these conditions and in accordance with the same known property mentioned earlier, the two light signals shunted to the branch 1a are transmitted within the fiber 2 with different propagation times. Thus the light signal of wavelength $\lambda_1$ propagates within the fiber 2 during a time interval $\tau_1$ whilst the light signal having a wavelength $\lambda_2$ propagates during a time interval $\tau_2$ which is different from $\tau_1$.

As shown in the FIGURE, two photodetectors $P_1$ and $P_2$ such as avalanche photodiodes, for example, are placed respectively opposite to the optical fiber 2 and opposite to the fiber branch 1b. Thus the photodiode $P_1$ detects a part of the periodic modulation signals having respective time delays corresponding to the sum of the first propagation times $(T_1; T_2)$ and of the second propagation times $(\tau_1; \tau_2)$ whilst the second photodiode $P_2$ detects the other part of the periodic modulation signals having respective time delays corresponding to the first propagation times $(T_1; T_2)$. In the example chosen, the photodiode $P_1$ generates at its output B a signal of the form:

$$S_B(t) = \tfrac{1}{2}[S_1(t - T_1 - \tau_1) + S_2(t - T_2 - \tau_2)]$$

whence $$S_B(t) = \tfrac{1}{2}\left[\sum_{-\infty}^{+\infty} a_n(t - nT - T_1 - \tau_1) + \sum_{-\infty}^{+\infty} b_n(t - nT - T_2 - \tau_2)\right]$$

and the photodiode $P_2$ generates at its output C a signal of the form:

$$S_C(t) = \tfrac{1}{2} S_A(t)$$

that is, $$S_C(t) = \tfrac{1}{2}[S_1(t-T_1) + S_2(t-T_2)]$$

whence $$S_C(t) = \tfrac{1}{2}\left[\sum_{-\infty}^{+\infty} a_n(t - nT - T_1) + \sum_{-\infty}^{+\infty} b_n(t - nT - T_2)\right]$$

The separating device according to the invention further comprises delay means 10 constituted for example by a coaxial cable, said means being connected to the output C of the photodetector $P_2$. The value of the time delay introduced by these means is so adjusted as to be equal to one of the propagation times $(\tau_1; \tau_2)$ introduced by the optical fiber 2. If the time delay adopted is equal to $\tau_1$ in the example chosen, the signal obtained at the output D of the delay means 10 is of the form:

$$S_D(t) = S_C(t - \tau_1)$$

whence $$S_D(t) = \tfrac{1}{2}[S_1(t - T_1 - \tau_1) + S_2(t - T_2 - \tau_1)]$$

that is, $$S_D(t) = \tfrac{1}{2}\left[\sum_{-\infty}^{+\infty} a_n(t - nT - T_1 - \tau_1) + \sum_{-\infty}^{+\infty} b_n(t - nT - T_2 - \tau_1)\right]$$

The output B of the photodetector $P_1$ and the output D of the delay means 10 are connected to a differentiator 20 of conventional structure. Said differentiator 20 therefore establishes the difference between the signal produced by the delay means 10 and the signal detected by the photodiode $P_1$. Thus, in the example chosen, the differentiator 20 delivers at its output E a periodic signal of the form:

$$S_E(t) = S_D(t) - S_B(t)$$

whence $$S_E(t) = \tfrac{1}{2}[S_2(t - T_2 - \tau_1) - S_2(t - T_2 - \tau_2)]$$

that is, $$S_E(t) = \frac{1}{2}\left[\sum_{-\infty}^{+\infty} b_n(t - nT - T_2 - \tau_1) - \sum_{-\infty}^{+\infty} b_n(t - nT - T_2 - \tau_2)\right]$$

This resultant signal $S_E(t)$ therefore makes use only of the periodic signal which modulates the laser diode at the wavelength $\lambda_2$.

If the length L of the optical fiber 2 is chosen so as to ensure that the difference in propagation times $(\tau_1-\tau_2)$ is equal to the period (T) of the modulation signals, that is $\tau_1-\tau_2=T$, the signal $S_E(t)$ becomes:

$$S_E(t) = \frac{1}{2}\left[\sum_{-\infty}^{+\infty} b_n(t - nT - T_2 - T - \tau_2) - \sum_{-\infty}^{+\infty} b_n(t - nt - T_2 - \tau_2)\right]$$

whence $$(1)\ S_E(t) = \frac{1}{2}\left[\sum_{-\infty}^{+\infty} b_{n+1}(t - (n + 1)T - T_2 - \tau_2) - \sum_{-\infty}^{+\infty} b_n(t - nT - T_2 - \tau_2)\right]$$

This signal $S_E(t)$ therefore corresponds to a coding of the periodic signal $S_2(t)$ which modulates the laser diode of wavelength $\lambda_2$.

By way of illustration, in the case of two signals coded at 140 Mbt/s (T=6 ns) and transmitted at the two wavelengths $\lambda_1=0.85\ \mu m$ and $\lambda_2=1.3\ \mu m$, the length L of the optical fiber 2 will be chosen so as to be equal to:

$$\frac{1000 \times 6}{50} = 120\ m.$$

The output E of the differentiator 20 is connected to an electronic processing circuit 30 comprising decoding means 31 of conventional structure which are connected to the output E of the differentiator 20. Said means 31 carry out decoding of the periodic signal $S_E(t)$ given by equation (1) and produce at the output F the modulation signal $S_2(t)$ which modulates the laser diode of wavelength $\lambda_2$ and consequently the sequence of amplitudes $b_n$ of the data transmitted at the wavelength $\lambda_2$.

The processing circuit 30 is also provided with means 32 for detecting the other periodic signal ($S_1(t)$ in the example chosen) which modulates the laser diode at the wavelength $\lambda_1$, said detection means being connected between the output F of the decoding means 31 and the output D of the delay means 10. More specifically, the detection means 32 comprise a delay line 33 such as a coaxial cable, for example, in which the value of the time delay is equal to $T_2+\tau_1$ with the result that the signal at its output G in the example chosen is of the form:

$$S_G(t)=S_F[t-(T_2+\tau_1)]$$

whence
$$S_G(t)=S_2(t-T_2-\tau_1)$$

The detection means 32 also comprise a differentiator 34 connected between the output G of the delay line 33 and the output D of the delay line 10. Said differentiator 34 therefore establishes the difference between the signals generated by each delay line 10 and 33, with the result that the differentiator 34 delivers at its output H, after shaping, the periodic signal $S_1(t)$ which modulates the laser diode at the wavelength $\lambda_1$. In fact, in the example chosen, the signal at the output H is of the form:

$$S_H(t)=S_D(t)-S_G(t)$$

whence $$S_H(t)=\frac{1}{2}S_1(t-T_1-\tau_1)$$

There is consequently obtained the sequence of amplitudes $a_n$ of the data transmitted at the wavelength $\lambda_1$.

It will be noted that the input D of the differentiator 34 can also be connected either to the input C of the delay line 10 or to the input B of the differentiator 20 without thereby departing from the scope of the invention. Under these conditions, the value of the time delay introduced by the delay line 33 will be chosen so as to ensure that the difference established by the differentiator 34 no longer causes the appearance of the periodic signal $S_2(t)$.

What is claimed is:

1. A device for separating two light signals emitted by two sources having different wavelengths, each light source being modulated by a periodic signal, said light signals having different wavelengths being transmitted in one and the same optical fiber with first propagation times of different value and the optical fiber being terminated in a first branched-off portion of fiber and in a second branched-off portion of fiber, a part of the light signals transmitted being shunted to each portion, wherein the first branched-off portion of fiber is provided with a predetermined extension in which the shunted light signals are transmitted with second propagation times of different value, and wherein said device comprises:

a first photodetector and a second photodetector which are placed respectively opposite to the extension of the first branched-off portion of fiber and opposite to the second branched-off portion of fiber, said first photodetector being intended to detect part of the periodic modulation signals having respective time-delays corresponding to the sum of said first and second propagation times and said second photodetector being intended to detect the other part of the periodic modulation signals having respective time delays corresponding to said first propagation times;

first delay means connected to said second photodetector and adapted to introduce a time delay equal to one of the second propagation times;

first means for differentiation between the delayed periodic signals generated by said first delay means and the delayed periodic signals detected by said first photodetector, said differentiating means being intended to deliver a delayed periodic signal corresponding to a coding of one of the periodic signals which modulates one of the two light sources having different wavelengths;

an electronic circuit for processing the delayed periodic signals and comprising means for detecting the other periodic signal which modulates the other light source, said detection means being connected between the output and one of the inputs of the first differentiating means.

2. A device according to claim 1, wherein said processing circuit further comprises means for decoding the periodic signal generated by said first differentiating means, said decoding means being connected between the output of the first differentiating means and the input of the detection means, said decoding means being intended to deliver one of the two periodic signals for modulating one of the light sources having different wavelengths.

3. A device according to claim 1, wherein said detection means comprise:

second delay means connected to the output of said decoding means and thus introducing a time delay in the case of one of the periodic modulation signals generated by the decoding means;

second differentiating means connected between the output of said second delay means and the input of said first differentiating means which is connected to the first delay means, said second differentiating means being intended to deliver the other periodic modulation signal.

4. A device according to claim 1. wherein the two periodic modulation signals have the same period.

5. A device according to claim 4, wherein said extension of the first branched-off portion of fiber is so dimensioned that the difference between the second propagation times is equal to the period of the modulation signals.

6. A device according to claim 1, wherein said extension of the first branched-off portion of fiber is constituted by an optical fiber added to said first branched-off portion of fiber.

7. A device according to claim 1, wherein said periodic modulation signals are digital signals.

8. A device according to claim 1, wherein said first and second photodetectors are avalanche photodiodes.

* * * * *